(12) United States Patent
Hundal et al.

(10) Patent No.: US 10,459,865 B2
(45) Date of Patent: Oct. 29, 2019

(54) DEVICES AND METHODS FOR PROVIDING CONCURRENT SUPERSPEED COMMUNICATION AND FOUR-LANE DISPLAYPORT COMMUNICATION VIA A USB TYPE-C RECEPTACLE

(71) Applicant: Icron Techonologies Corporation, Burnaby (CA)

(72) Inventors: Sukhdeep Singh Hundal, Surrey (CA); Thomas Aaron Schultz, Langley (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 15/938,930

(22) Filed: Mar. 28, 2018

(65) Prior Publication Data
US 2018/0314662 A1   Nov. 1, 2018

Related U.S. Application Data

(63) Continuation of application No. 14/884,613, filed on Oct. 15, 2015, now Pat. No. 9,952,996.
(Continued)

(51) Int. Cl.
*G06F 13/40* (2006.01)
*G06F 13/42* (2006.01)
*G06F 13/38* (2006.01)

(52) U.S. Cl.
CPC ........ *G06F 13/4022* (2013.01); *G06F 13/385* (2013.01); *G06F 13/387* (2013.01);
(Continued)

(58) Field of Classification Search
CPC .. G06F 13/385; G06F 13/387; G06F 13/4022; G06F 13/4068; G06F 13/4081;
(Continued)

(56) References Cited

U.S. PATENT DOCUMENTS 8,549,197 B2    10/2013   Hall
8,615,611 B2    12/2013   Hall
(Continued)

OTHER PUBLICATIONS

"DisplayPort v1.3: Feature Summary," PowerPoint presentation, Sep. 18, 2014, VESA, <http://www.displayport.org/wp-content/uploads/2014/09/DP-1.3-Overview-for-VESA-v1.pdf> [retrieved Dec. 31, 2015], 14 pages.
(Continued)

*Primary Examiner* — Eric T Oberly
(74) *Attorney, Agent, or Firm* — Christensen O'Connor Johnson Kindness PLLC

(57) ABSTRACT

In some embodiments, the present disclosure provides techniques for concurrently exchanging USB 2.0 information, SuperSpeed information, and four lanes of DisplayPort information via a single USB Type-C connection. In some embodiments, this may be accomplished in part by multiplexing signals such as the USB 2.0 signals and the DisplayPort AUX signal to fewer than a standard number of conductors in order to free up other conductors for the third and fourth lanes of DisplayPort information. In some embodiments, a standard USB Type-C receptacle, plug, and cable are used. In some embodiments, a modified receptacle, plug, and/or cable are provided.

12 Claims, 12 Drawing Sheets

Related U.S. Application Data

(60) Provisional application No. 62/064,401, filed on Oct. 15, 2014.

(52) U.S. Cl.
CPC ...... *G06F 13/4282* (2013.01); *G06F 13/4295* (2013.01); *G06F 13/4068* (2013.01); *G06F 13/4081* (2013.01); *G06F 2213/0042* (2013.01)

(58) Field of Classification Search
CPC ............. G06F 13/4282; G06F 13/4295; G06F 2213/0042
See application file for complete search history.

(56) References Cited

U.S. PATENT DOCUMENTS

| | | | |
|---|---|---|---|
| 8,671,234 B2* | 3/2014 | Kobayashi | H04L 5/16 710/62 |
| 2011/0087806 A1* | 4/2011 | Mohanty | G06F 13/385 710/16 |
| 2011/0157201 A1 | 6/2011 | Hedges | |
| 2012/0012358 A1* | 1/2012 | Horan | H04L 25/0272 174/113 R |
| 2015/0212497 A1 | 7/2015 | Dunstan | |
| 2016/0253283 A1 | 9/2016 | Bowers et al. | |
| 2016/0378704 A1* | 12/2016 | Adamson | G06F 13/364 710/104 |
| 2017/0012796 A1* | 1/2017 | Velasco | H04N 21/2343 |
| 2017/0109312 A1 | 4/2017 | Voor et al. | |

OTHER PUBLICATIONS

International Search Report and Written Opinion dated Dec. 24, 2015, issued in corresponding International Application No. PCT/CA2015/051065, filed Oct. 21, 2015, 10 pages.

Lewis, D., "SerDes Architectures and Applications," DesignCon 2004, Santa Clara, Calif., Feb. 2-5, 2004, 14 pages.

Smith, R., "DisplayPort Alternate Mode for USB Type-C Announced—Video, Power, & Data All Over Type-C," Sep. 22, 2014, AnandTech, <http://www.anandtech.com/show/8558/displayport-alternate-mode-for-usb-typec-announced> [retrieved Dec. 21, 2015], 8 pages.

Smith, R., "VESA Releases DisplayPort 1.3 Standard: 50% More Bandwidth, New Features," Sep. 16, 2014, AnandTech, <http://www.anandtech.com/show/8533/vesa-releases-displayport-13-standard-50-more-bandwidth-new-features> [retrieved Dec. 21, 2015], 6 pages.

"Universal Serial Bus 3.1 Specification," Revision 1.0, Jul. 26, 2013, Hewlett-Packard Company, Intel Corporation, Microsoft Corporation, Renesas Corporation, ST-Ericsson, and Texas Instruments, 631 pages.

"Universal Serial Bus Power Delivery Specification," Revision 2.0, V1.1, May 7, 2015, Hewlett-Packard Company, Intel Corporation, LSI Corporation, Microsoft Corporation, Renesas, ST-Microelectronics, and Texas Instruments, 544 pages.

"Universal Serial Bus Specification," Revision 2.0, Apr. 27, 2000, Compaq Computer Corporation, Hewlett-Packard company, Intel Corporation, Lucent Technologies Inc, Microsoft Corporation, NEC Corporation, and Koninklijke Philips Electronics N.V., 650 pages.

"Universal Serial Bus Type-C Cable and Connector Specification," Revision 1.1, Apr. 3, 2015, USB 3.0 Promoter Group, 180 pages.

"VESA DisplayPort Alt Mode for USB Type-C Standard: Feature Summary," PowerPoint presentation, Sep. 22, 2014, VESA, <http://www.displayport.org/wp-content/uploads/2014/09/DP-Alt-Mode-Overview-for-VESA-v1.pdf> [retrieved Dec. 31, 2015], 17 pages.

"VESA DisplayPort Standard: Version 1, Revision 1a," Jan. 11, 2008, VESA (Video Electronics Standards Association), 238 pages.

Walls, F., and S. MacInnis, "VESA Display Stream Compression," Mar. 3, 2014, VESA (Video Electronics Standards Association), 5 pages.

* cited by examiner

| A1 | A2 | A3 | A4 | A5 | A6 | A7 | A8 | A9 | A10 | A11 | A12 |
|----|----|----|----|----|----|----|----|----|-----|-----|-----|
| GND | TX1+ | TX1- | VBUS | CC1 | D1+ | D1- | SBU1 | VBUS | RX2- | RX2+ | GND |
| GND | RX1+ | RX1- | VBUS | SBU2 | D2- | D2+ | CC2 | VBUS | TX2- | TX2+ | GND |
| B12 | B11 | B10 | B9 | B8 | B7 | B6 | B5 | B4 | B3 | B2 | B1 |

| A12 | A11 | A10 | A9 | A8 | A7 | A6 | A5 | A4 | A3 | A2 | A1 |
|-----|-----|-----|----|----|----|----|----|----|----|----|----|
| GND | RX2+ | RX2- | VBUS | SBU1 | D1- | D1+ | CC | VBUS | TX1- | TX1+ | GND |
| GND | TX2+ | TX2- | VBUS | VCONN | D2+ | D2- | SBU2 | VBUS | RX1- | RX1+ | GND |
| B1 | B2 | B3 | B4 | B5 | B6 | B7 | B8 | B9 | B10 | B11 | B12 |

DEVICES AND METHODS FOR PROVIDING CONCURRENT SUPERSPEED COMMUNICATION AND FOUR-LANE DISPLAYPORT COMMUNICATION VIA A USB TYPE-C RECEPTACLE

CROSS-REFERENCES TO RELATED APPLICATION(S)

This application is a continuation of application Ser. No. 14/884613, filed Oct. 15, 2015, which claims the benefit of Provisional Application No. 62/064401, filed Oct. 15, 2014, the entire disclosures of which are hereby incorporated by reference herein for all purposes.

BACKGROUND

Standards have been published that describe a universal serial bus (USB) Type-C connector, plug, and cable that can support communication via USB 2.0, SuperSpeed, and DisplayPort via the same connector, including concurrent communication of at least some of these signals. USB 2.0 communication can include low-speed, full-speed, and high-speed communication, and is described in detail at least in "Universal Serial Bus Specification, Revision 2.0," released on Apr. 27, 2000 by Compaq et al. SuperSpeed communication includes normal SuperSpeed communication and Enhanced SuperSpeed communication. SuperSpeed communication is described in detail at least in "Universal Serial Bus 3.1 Specification, Revision 1.0," released on Jul. 26, 2013 by Hewlett-Packard Company et al. USB Type-C connectors, plugs, and cables are described in detail at least in "Universal Serial Bus Type-C Cable and Connector Specification, Revision 1.1," released on Apr. 3, 2015 by USB 3.0 Promoter Group. Power delivery over USB and the negotiation thereof is described in detail at least in "Universal Serial Bus Power Delivery Specification, Revision 2.0, Version 1.1," released on May 7, 2015 by Hewlett-Packard Packard Company et al. DisplayPort communication is described in detail at least in "VESA DisplayPort Standard, Version 1.3," released on Sep. 15, 2015, by VESA. Communication of DisplayPort information over a USB Type-C interface is described in detail at least in the VESA DisplayPort Alt Mode Standard, Version 1, released on Sep. 22, 2014 by VESA. Each of these documents and their contents are known to one of ordinary skill in the art, and are hereby incorporated by reference herein along with any earlier versions or related documents mentioned therein in their entireties for all purposes.

When SuperSpeed communication and DisplayPort communication are being concurrently transmitted according to these specifications, at most two differential pairs of conductors are provided for use by DisplayPort. Accordingly, according to the existing techniques, only two lanes of DisplayPort communication are allowed to be transmitted concurrently with SuperSpeed communication. What is needed are techniques for allowing full performance DisplayPort connectivity via a USB Type-C connection while concurrently providing SuperSpeed and USB 2.0 communication over the same connection.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for communicating USB and DisplayPort information via a USB Type-C receptacle is provided. The system comprises a computing device comprising a USB host controller, a DisplayPort source graphical processing unit (GPU), a USB Type-C receptacle, and a switching device. The USB host controller includes a USB 2.0 differential pair. The DisplayPort source GPU includes an AUX differential pair. The switching device includes a multiplexer (MUX) device. The USB 2.0 differential pair and the AUX differential pair are electrically coupled to the MUX device. The MUX device is configured to enable communication via both the USB 2.0 differential pair and the AUX differential pair via a configuration channel (CC) pin of the USB Type-C receptacle.

In some embodiments, a switching device for coupling a USB host and a DisplayPort source to a USB Type-C receptacle is provided. The switching device comprises a set of conductors configured to be coupled to pins of the USB Type-C receptacle; a set of conductors configured to be coupled to SuperSpeed conductors of the USB host; a set of conductors configured to be coupled to DisplayPort lane conductors of the DisplayPort source; and a multiplexer (MUX) device. The MUX device is configured to be coupled to USB 2.0 conductors of the USB host and to AUX conductors of the DisplayPort source. The MUX device is configured to combine signals from the USB 2.0 conductors and the AUX conductors for communication via at least one pin of the USB Type-C receptacle.

In some embodiments, a cable is provided. The cable comprises a plug and wires. The plug has pins compliant with a USB Type-C plug standard. The wires are compliant with a USB Type-C wiring standard except for the side band use (SBU) wires.

In some embodiments, a method of negotiating communication paths between USB Type-C receptacles is provided. A connection is detected between a USB Type-C upstream facing port and a USB Type-C downstream facing port via a cable. Capabilities supported by the upstream facing port and the downstream facing port are determined. In response to determining that both the upstream facing port and the downstream facing port support concurrent transmission of four lanes of DisplayPort, SuperSpeed, and USB 2.0 information USB 2.0 and DisplayPort AUX information are multiplexed for transmission over the cable in order to free up conductors to support concurrent transmission of four lanes of DisplayPort and SuperSpeed information.

In some embodiments, a system for communicating USB and DisplayPort information via a USB Type-C receptacle is provided. The system comprises a computing device which comprises a USB host controller, a DisplayPort source graphical processing unit (GPU), a USB Type-C receptacle, and a switching device. The USB host controller includes a USB 2.0 differential pair. The DisplayPort source GPU includes an AUX differential pair. The USB Type-C receptacle includes a first side band use (SBU) pin and a second SBU pin. The switching device includes a multiplexer (MUX) device. The USB 2.0 differential pair and the AUX differential pair are coupled to the switching device. The switching device is configured to selectively couple the USB 2.0 differential pair and the AUX differential pair to the MUX device. The MUX device is configured to enable communication via both the USB 2.0 differential pair and the AUX differential pair via the first SBU pin and the second SBU pin.

In some embodiments, a cable is provided. The cable comprises at least one plug and a plurality of wires. The at least one plug has a shape configured to mate with a USB Type-C receptacle. The at least one plug includes twenty-four pins configured to mate with a twenty-four corresponding pins of the USB Type-C receptacle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a schematic diagram that illustrates a standard USB Type-C receptacle;

FIG. 1B is a schematic diagram that illustrates a standard USB Type-C plug;

FIG. 2A is a schematic diagram that illustrates an exemplary embodiment of a receptacle according to various aspects of the present disclosure;

FIG. 2B is a schematic diagram that illustrates an exemplary embodiment of a plug according to various aspects of the present disclosure;

DETAILED DESCRIPTION

Figure 3A:
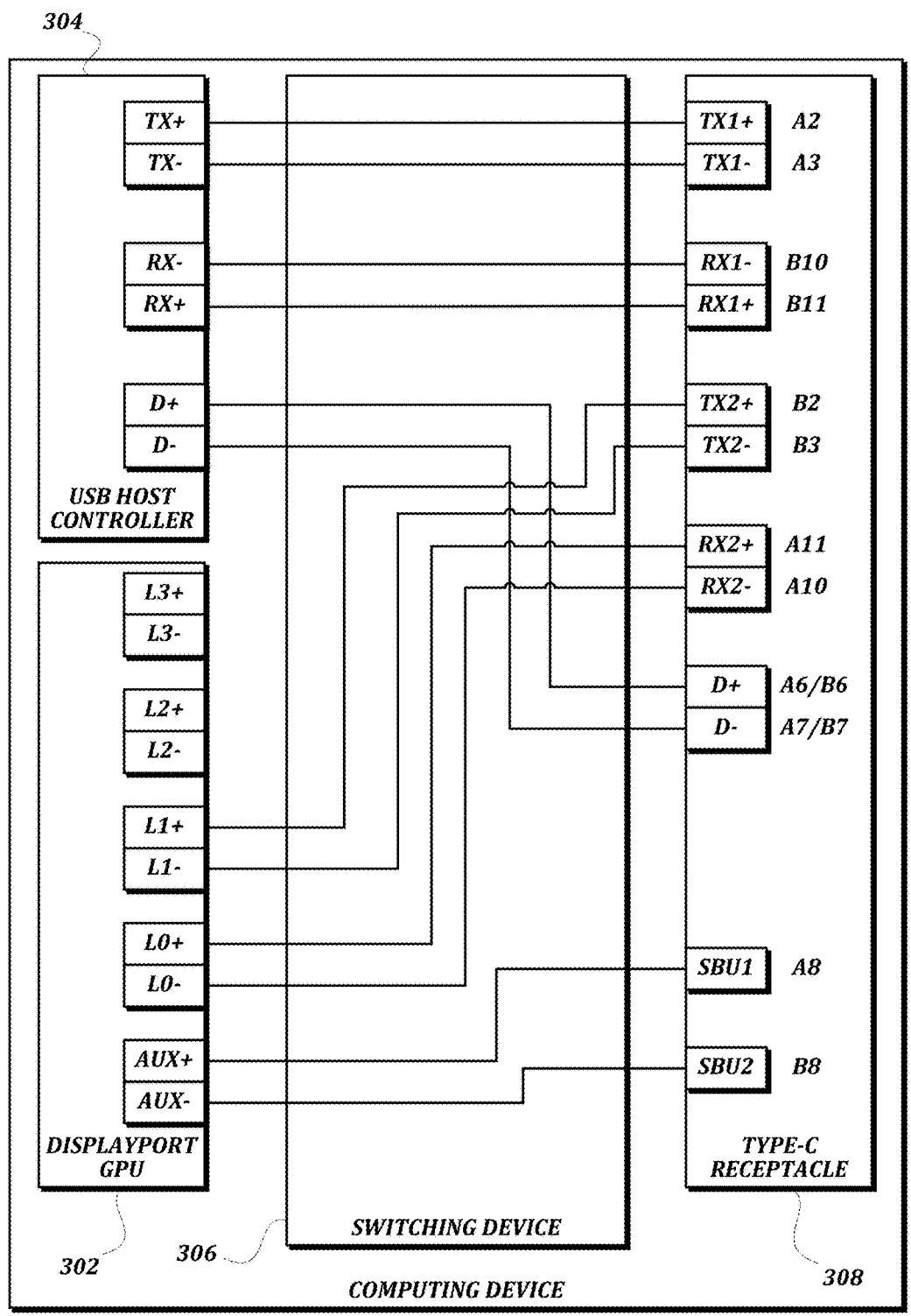
FIG. 3A illustrates a typical embodiment of concurrent transmission of USB 2.0, SuperSpeed, and DisplayPort communication via a USB Type-C receptacle according to the published standards.

In some embodiments, the present disclosure provides techniques for concurrently exchanging USB 2.0 information, SuperSpeed information, and four lanes of DisplayPort information via a single USB Type-C connection. In some embodiments, this may be accomplished in part by multiplexing lower bandwidth signals such as the USB 2.0 signals and the DisplayPort AUX signal in order to free up conductors for the extra lanes of DisplayPort information, thereby providing full bandwidth DisplayPort support.

Figures 1A, 1B:
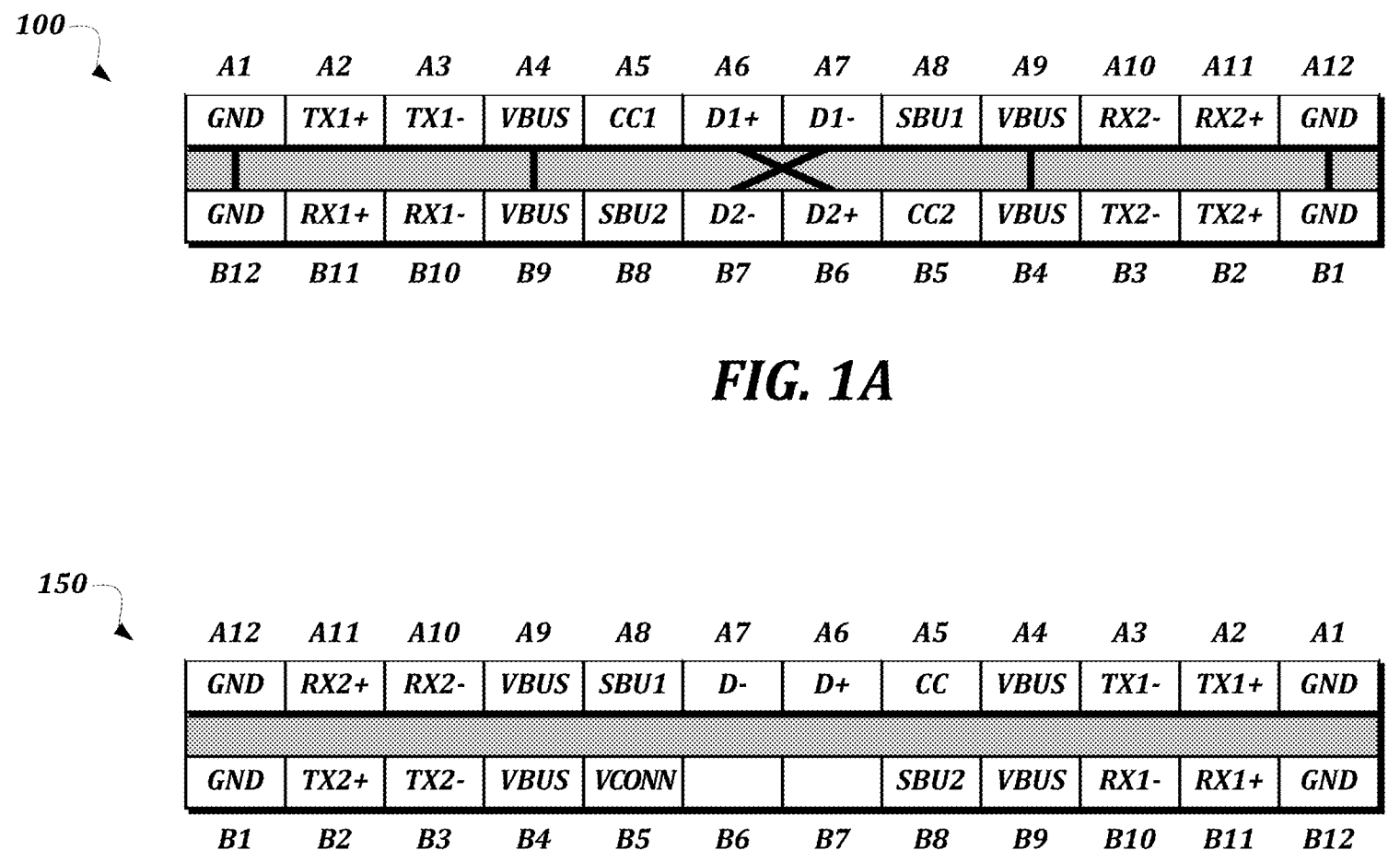

FIGS. 1A and 1B are schematic diagrams that illustrate a standard USB Type-C receptacle and a standard USB Type-C plug, respectively. The USB Type-C receptacle 100 may provide a downstream facing port on a host device or a hub device, or may instead provide an upstream facing port on a hub device or a USB peripheral device. The receptacle 100 includes two rows of twelve pins, for a total of twenty-four pins. In the receptacle 100, pins A1, B12, A12, and B1 are used for ground, and pins A4, B9, A9, and B4 are used for power transmission. The remaining pins in the receptacle 100 are used for the transmission of various signals. According to the USB Type-C Specification, pins A2 and A3 are intended as a first SuperSpeed transmit differential pair; pins B11 and B10 are intended as a first SuperSpeed receive differential pair, pins A10 and A11 are intended as a second SuperSpeed receive differential pair, pins B3 and B2 are intended as a second SuperSpeed transmit differential pair, pins A6 and A7 are intended as a first USB 2.0 differential pair, pins B7 and B6 are intended as a second USB 2.0 differential pair, and pins A8 and B8 are two side band use (SBU) conductors. One of pins A5 and B5 is intended for use as a configuration channel (CC) conductor depending on the orientation of the connected plug, and the other of pins A5 and B5 is intended for use to provide power for circuits in a connected plug.

The pins of the plug 150 have matching intended purposes, except that in a standard plug 150, pin A5 is intended for CC communication instead of being interchangeable with pin B5 so that the upstream facing port and downstream facing port can use the CC signals to determine plug orientation and twist of the cable. Also, the USB Type-C specification requires that only one set of pins are present for connection to USB 2.0. As such, pins A6 and A7 are present in the plug 150, but pins B6 and B7 are not present in the plug 150. One purpose of the USB Type-C Specification is to provide a plug 150 that may be reversibly inserted into the receptacle 100. Each of the pins on the plug 150 is configured to mate with an appropriate pin on the receptacle 100 regardless of the orientation in which the plug 150 is inserted. Accordingly, the intention of pin A5 (CC) and pin B5 ($V_{CONN}$) may be swapped upon detection of the orientation of the plug 150 as explained in the USB Type-C Specification. Also, pins A6 and A7 of the plug 150 are intended to mate with either pins A6 and A7 of the receptacle 100 or pins B6 and B7 of the receptacle 100. Since only one set of pins on the receptacle 100 intended for USB 2.0 communication will connect according to the USB Type-C Specification, the standard allows pin A6 to be shorted to pin B6 within the receptacle, and allows pin A7 to be shorted to pin B7 within the receptacle. Shorted pins are illustrated in FIG. 1A by a connecting line.

FIGS. 2A and 2B are schematic diagrams that illustrate exemplary embodiments of a receptacle 200 and a plug 250, respectively, according to various aspects of the present disclosure. The receptacle 200 and plug 250 are similar to the receptacle 100 and plug 150 illustrated and described above, but for a couple of differences. In the receptacle 200, pin A6 is not shorted to pin B6, and pin A7 is not shorted to pin B7. This allows different signals to be communicated via pin A6 and pin B6, as well as allowing different signals to be communicated via pin A7 and B7. In the plug 250, both pairs of pins A6, A7, and pins B6, B7 are present, and each of pins A6, A7, B6, B7 is electrically connected to a separate wire in the associated cable.

FIG. 3A illustrates a typical embodiment of concurrent transmission of USB 2.0, SuperSpeed, and DisplayPort communication via a USB Type-C receptacle according to the published standards. The illustrated computing device 300 includes a USB host controller 304, a DisplayPort graphical processing unit (GPU) 302, a switching device 306, and a USB Type-C receptacle 308. The computing device 300 may be any type of computing device that includes these components, including but not limited to a laptop computing device, a desktop computing device, a tablet computing device, and/or any other type of computing device that includes the illustrated elements. Also, though a computing device 300 with a USB Type-C receptacle that acts as a downstream facing port is illustrated, one of ordinary skill in the art will recognize that similar techniques may be used by a USB Type-C receptacle that acts as an upstream facing port to provide access to a USB device or hub and a DisplayPort sink.

As illustrated, the USB host controller 304 provides a SuperSpeed transmit differential pair (TX+/TX−), a SuperSpeed receive differential pair (RX+/RX−), and a USB 2.0 differential pair (D+/D−). One of ordinary skill in the art will recognize that the USB host controller 304 may optionally provide a second set of SuperSpeed transmit and receive differential pairs to support reversible connections. Because the switching device 306 would only couple an active set of SuperSpeed differential pairs to the USB Type-C receptacle 308, the optional set of SuperSpeed differential pairs has not been illustrated herein, but one of ordinary skill in the art will recognize that the second optional set of SuperSpeed differential pairs could be used instead of the illustrated set of differential pairs without departing from the scope of the present disclosure. As illustrated, the DisplayPort GPU 302 provides four lanes of DisplayPort output, each of which is transmitted using a separate differential pair (L0+/L0−; L1+/L1−; L2+/L2−; L3+/L3−). The DisplayPort GPU 302 also provides an auxiliary (AUX) channel via an AUX differential pair (AUX+/AUX−) for command signaling.

Upon connection of a plug to the USB Type-C receptacle 308 and detection of plug orientation and cable twist, the switching device 306 couples conductors of the USB host controller 304 and the DisplayPort GPU 302 to the pins of the USB Type-C receptacle 308.

Assuming an un-flipped connection, the switching device 306 couples the SuperSpeed transmit differential pair to a first set of SuperSpeed transmit pins A2 and A3, the SuperSpeed receive differential pair to a first set of SuperSpeed receive pins B10 and B11, and the USB 2.0 differential pair to a pair of USB 2.0 pins A6/B6 and A7/B7. This leaves the second set of SuperSpeed transmit pins B2 and B3, and the second set of SuperSpeed receive pins A11 and A10 open for DisplayPort communication. As such, to support concurrent transmission of SuperSpeed and DisplayPort information via the USB Type-C connector per the standards, the switching device 306 couples the first lane differential pair to the second set of SuperSpeed receive pins A11 and A10, and the second lane differential pair to the second set of SuperSpeed transmit pins B2 and B3. The switching device 306 also couples the AUX differential pair to the pair of SBU pins A8 and B8. One of ordinary skill in the art will recognize that if the plug were inserted in a flipped configuration, different pins of the USB Type-C receptacle may be used. For example, the SuperSpeed transmit differential pair may be coupled to the second set of SuperSpeed transmit pins B2 and B3, and so on.

Figure 3B:
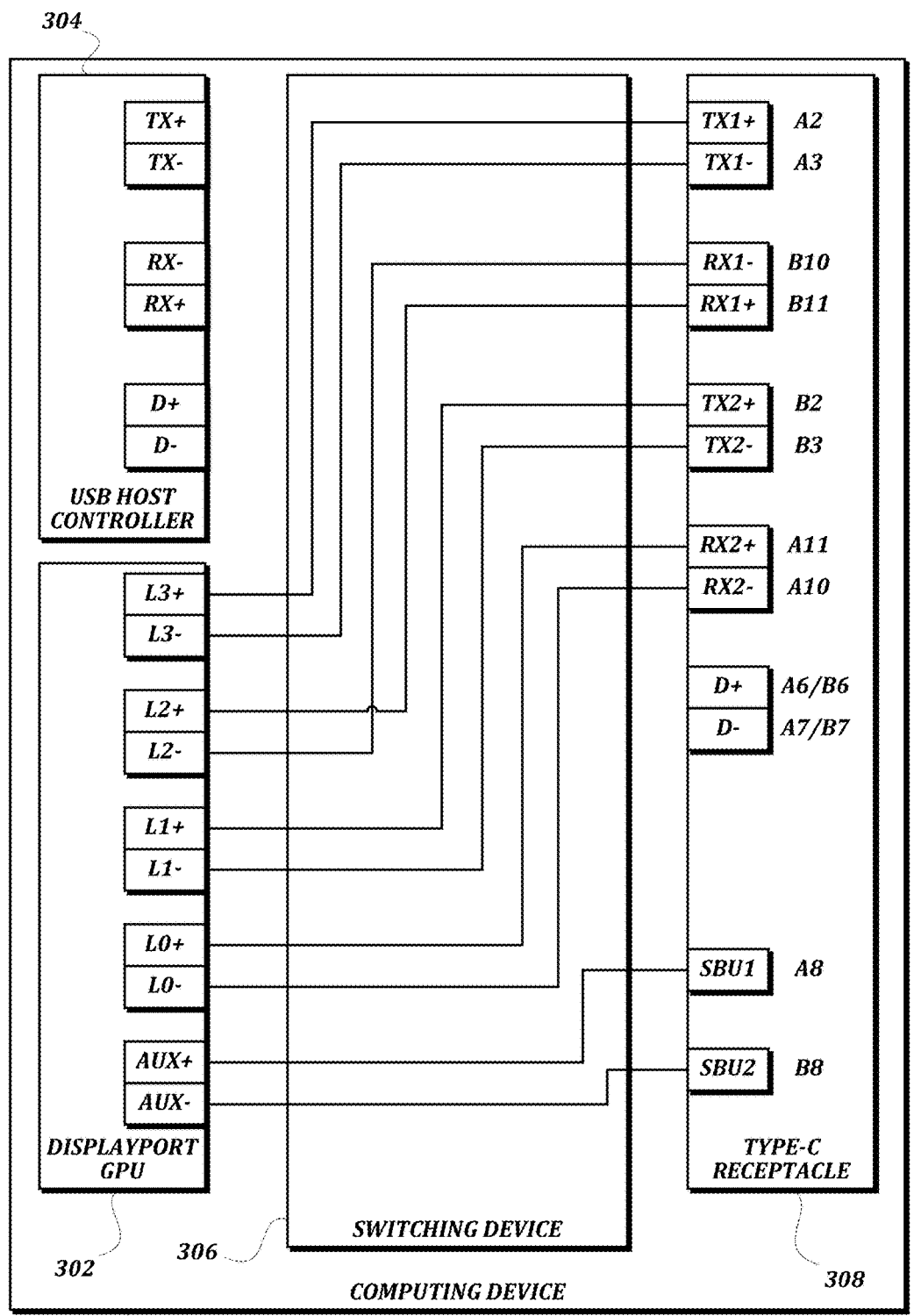
FIG. 3B illustrates a typical embodiment of a standard computing device configured to transmit full bandwidth DisplayPort information via a USB Type-C receptacle.

The standard embodiment illustrated in FIG. 3A allows for concurrent operation of DisplayPort and SuperSpeed via the USB Type-C receptacle, but it only provides limited performance because only two lanes out of four possible lanes of DisplayPort communication are supported. FIG. 3B illustrates a typical embodiment of a standard computing device 300 configured to transmit full bandwidth DisplayPort information via the USB Type-C receptacle 308. As illustrated, the first lane differential pair is coupled to the second set of SuperSpeed receive pins A11 and A10, the second lane differential pair is coupled to the second set of SuperSpeed transmit pins B2 and B3, the third lane differential pair is coupled to the first set of SuperSpeed receive pins B10 and B11, and the fourth lane differential pair is coupled to the first set of SuperSpeed transmit pins A2 and A3. As above, the AUX differential pair is coupled to the pair of SBU pins A8 and B8.

Though this configuration supports full bandwidth DisplayPort communication, it is only allowed in the standard configurations outlined in the specifications if SuperSpeed information is not being communicated because it uses all of the conductors in the USB Type-C receptacle 308 and cable for the DisplayPort communication.

The present disclosure provides various techniques for combining signals in order to transmit SuperSpeed USB communication and full bandwidth DisplayPort communication via a single USB Type-C receptacle. In some embodiments, a switching device is provided that includes a multiplexer (MUX) device. The MUX device combines at least two USB and DisplayPort signals, such as the USB 2.0 signals and the DisplayPort AUX signal, in order to conserve conductors on a cable for the transmission of SuperSpeed and DisplayPort data. At the other end of the cable, another MUX device separates the previously combined signals.

Figure 4:
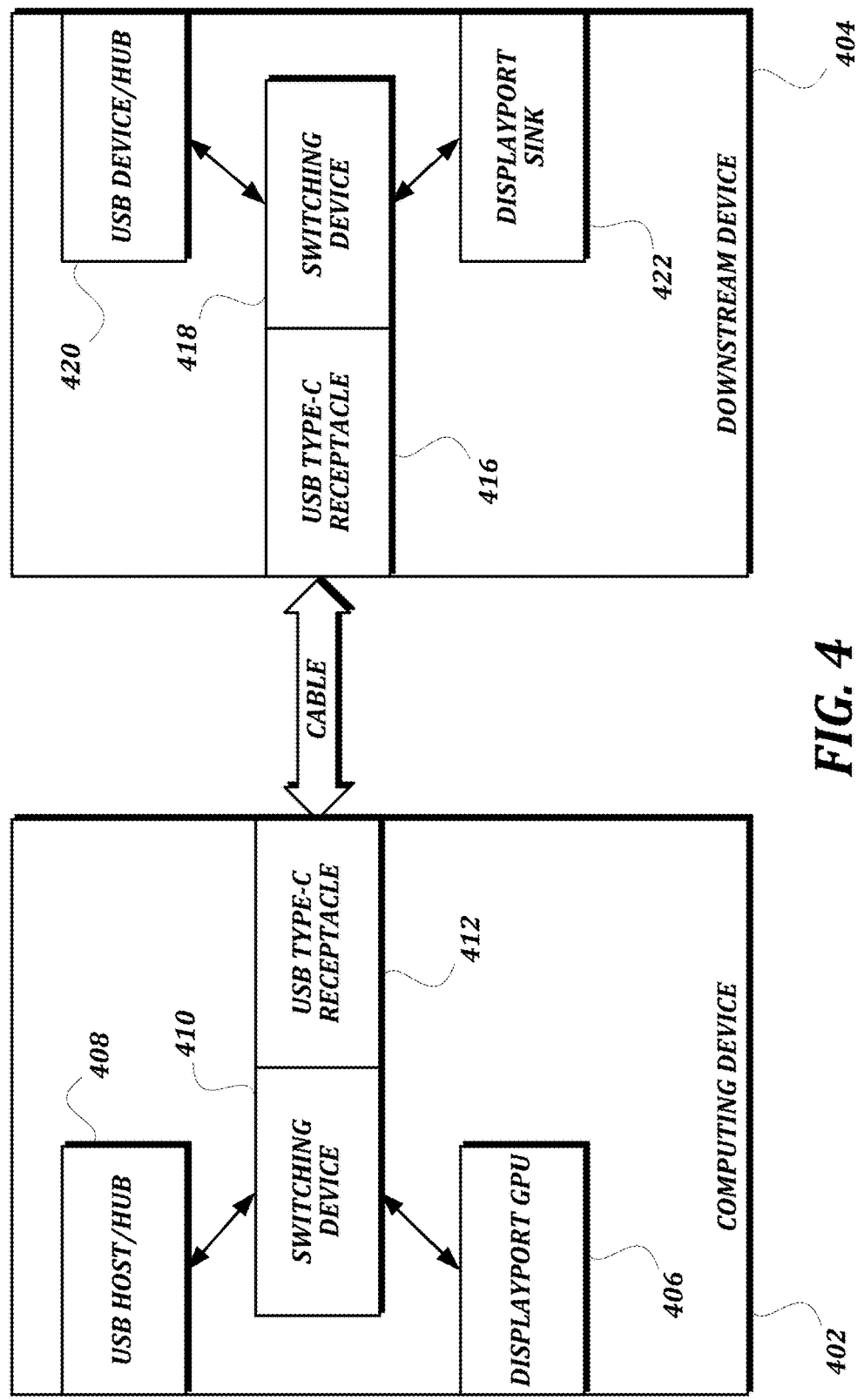
FIG. 4 is a block diagram that illustrates an exemplary embodiment of a topology according to various aspects of the present disclosure.

FIG. 4 is a block diagram that illustrates an exemplary embodiment of a topology according to various aspects of the present disclosure. In the topology illustrated in FIG. 4, the functionality of the present disclosure is built into a computing device 402 and a downstream device 404. A computing device 402, such as a laptop computing device, a desktop computing device, a tablet computing device, a smartphone computing device, and/or any other suitable type of computing device, includes a USB host or hub 408, a DisplayPort graphical processing unit (GPU) 406, and a switching device 410. In some embodiments, the switching device 410 (or the logic thereof) may be embedded within the USB host or hub 408 or the DisplayPort GPU 406. In some embodiments, the functionality of the switching device 410 may be provided by an embedded ASIC, or functionality could be implemented by discrete devices on a printed circuit board assembly that is communicatively coupled to the USB host or hub 408 and the DisplayPort GPU 406. The switching device 410 selectively couples conductors of the USB host or hub 408 and the DisplayPort GPU 406 to pins of the USB Type-C receptacle 412 as discussed in further detail below.

As illustrated, a cable couples the USB Type-C receptacle 412 of the computing device 402 to a USB Type-C receptacle 416 of a downstream device 404. The downstream device 404 may be any type of device that includes a DisplayPort sink and a USB device or hub, including but not limited to a monitor having an embedded USB hub or device, a projector having an integrated input device, a communication hub, and/or the like. The pins of the USB Type-C receptacle 416 are selectively coupled to a downstream USB device or hub 420 and a DisplayPort sink 422 by a switching device 418 using an inverse technique to that used by the switching device 410. As with the switching device 410, the switching device 418 (or logic thereof) may be embedded within the USB device or hub 420 or the DisplayPort sink 422, or may be provided by an embedded ASIC, or functionality could be implemented by discrete devices on a printed circuit board assembly that is communicatively coupled to the USB device or hub 420 and the DisplayPort sink 422. In some embodiments, either the USB Type-C receptacle 412 or the USB Type-C receptacle 416 may be omitted if the corresponding end of the cable is captive and thereby coupled directly to the corresponding switching device.

Figure 5:
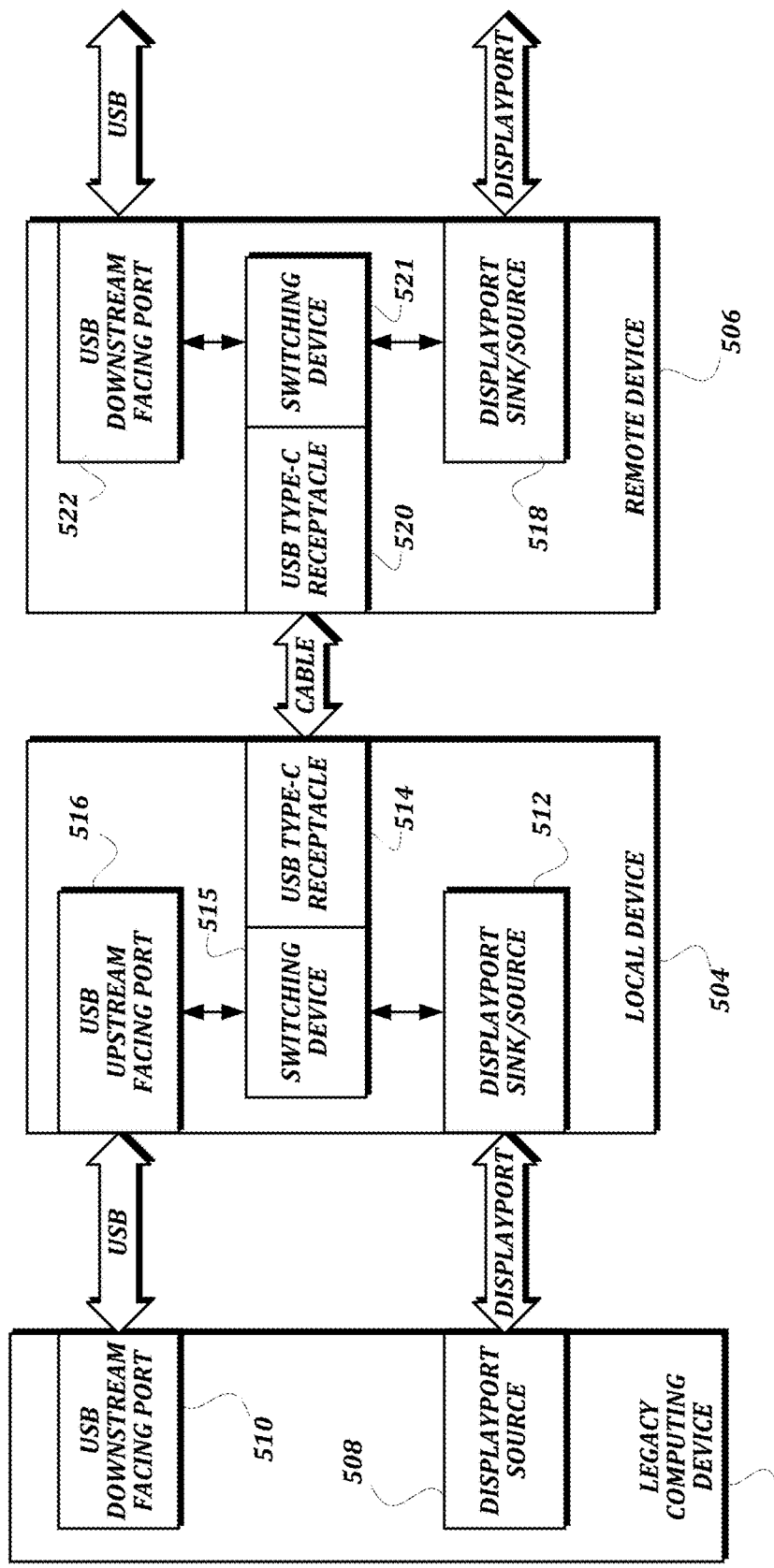
FIG. 5 is a block diagram that illustrates another exemplary embodiment of a topology according to various aspects of the present disclosure.

FIG. 5 is a block diagram that illustrates another exemplary embodiment of a topology according to various aspects of the present disclosure. In the topology illustrated in FIG. 5, the functionality of the present disclosure is provided for a legacy computing device by a local device external from the legacy computing device. The legacy computing device 502 includes a USB downstream facing port 510 and a DisplayPort source 508. A local device 504 includes a USB upstream facing port 516 and a DisplayPort sink/source 512. The USB upstream facing port 516 is coupled to the USB downstream facing port 510 using a USB cable (or any other suitable technique), and provides functionality similar to an upstream facing port of a USB hub (not illustrated). The DisplayPort sink/source 512 is coupled to the DisplayPort source 508 using a DisplayPort cable (or any other suitable technique), and, to the DisplayPort source 508, acts as a DisplayPort sink, before retransmitting the DisplayPort information as a DisplayPort source. A switching device 515 is communicatively coupled to the USB upstream facing port 516 and the DisplayPort sink/source 512, and selectively couples conductors associated with the USB upstream facing port 516 (or the downstream-facing portion of a USB hub implemented therein) and conductors associated with the source portion of the DisplayPort sink/source 512 to pins of the USB Type-C receptacle 514 as discussed in further detail below.

The remote device 506 includes a USB Type-C receptacle 520 coupled to the USB Type-C receptacle 514 of the local device 504 by a cable. As above, the pins of the USB Type-C receptacle 520 are selectively coupled to conductors of an upstream portion of a hub that includes a USB downstream facing port 522 and to conductors of a sink portion of a DisplayPort sink/source 518 by a switching device 521 as discussed in further detail below. The DisplayPort sink/source 518 is coupled to a DisplayPort sink via a DisplayPort cable (or via any other suitable technique), and the USB downstream facing port 522 is coupled to a USB device or hub via a USB cable (or via any other suitable technique).

As discussed above with respect to FIG. 4, in some embodiments the switching devices 515, 521 (or the logic thereof) may be embedded within the respective USB upstream facing port 516, USB downstream facing port 522, DisplayPort sink/source 512, or DisplayPort sink/source 518. In some embodiments, the functionality of the switching devices 515, 521 may be provided by embedded ASICs on printed circuit board assemblies that are communicatively coupled to the other illustrated components. Also, as discussed above, one of the USB Type-C receptacles 514, 520 may be omitted if that end of the cable is captive. Further, one of ordinary skill in the art will recognize that, in some embodiments, a local device 504 could be used with a downstream device 404, or computing device 402 could be used with a remote device 506.

Figure 6:
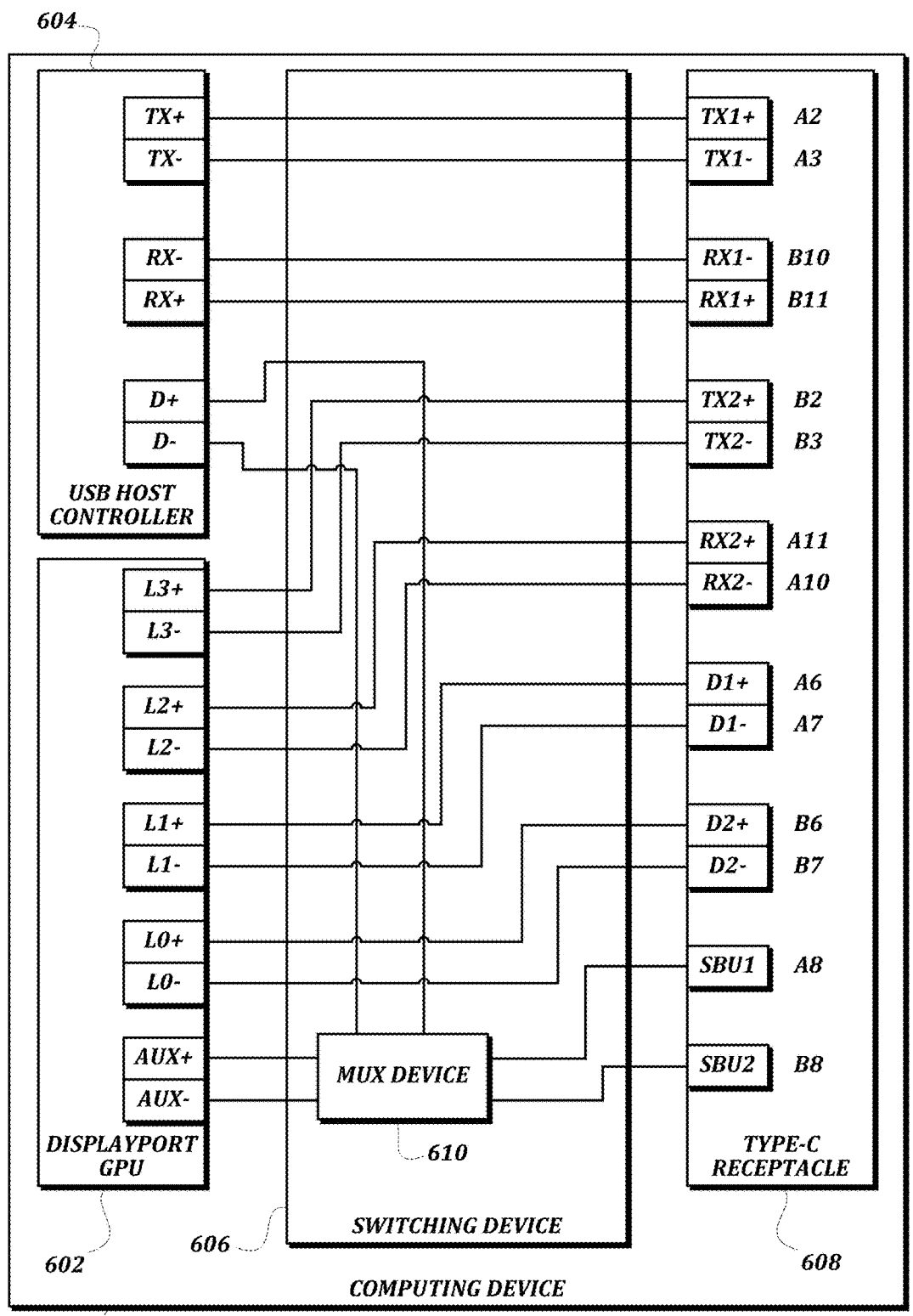
FIG. 6 is a schematic diagram that illustrates an exemplary embodiment of a computing device configured to concurrently communicate full-bandwidth DisplayPort information and SuperSpeed information via a USB Type-C receptacle according to various aspects of the present disclosure.

FIG. 6 is a schematic diagram that illustrates an exemplary embodiment of a computing device configured to concurrently communicate full-bandwidth DisplayPort information and SuperSpeed information via a USB Type-C receptacle according to various aspects of the present disclosure. The computing device 600 includes a DisplayPort GPU 602 and a USB host controller 604 similar to those discussed above. The USB Type-C receptacle 608 included in the computing device 600 is of the type illustrated in FIG. 2A, wherein the USB 2.0 pins A6/B6 and A7/B7 are not shorted to each other so that different signals may be transmitted on each pair of USB 2.0 pins.

The switching device 606 included in the computing device 600 includes a multiplexer (MUX) device 610. In some embodiments, the functionality of the MUX device 610 is provided by the circuitry of the switching device 1006 described above. In some embodiments, the MUX device 610 may be a separate ASIC or other similar device that provides the functionality of the MUX device 610, and provides one or more conductors to the switching device 1006 to be selectively coupled to the USB Type-C receptacle 608.

The USB 2.0 differential pair D+/D− of the USB host controller 604 is coupled to the MUX device 610, and the AUX differential pair of the DisplayPort GPU 602 is also coupled to the MUX device 610. The MUX device 610 is configured to multiplex signals from the USB 2.0 differential pair and the AUX differential pair for communication via the two SBU pins A8 and B8 of the USB Type-C receptacle. In some embodiments, the switching device 606 may be configurable to bypass the MUX device 610 and to connect the USB 2.0 differential pair D+/D− and the AUX differential pair directly to the pins of the USB Type-C receptacle 608 in order to provide fallback legacy functionality.

Any suitable technique for multiplexing the USB 2.0 signals and the AUX signals via the SBU pins A8 and B8 may be used. As one non-limiting example, the MUX device 610 may convert each of the differential signals to a single-ended signal, and may use one SBU pin for the AUX signal and the other SBU pin for the USB 2.0 signal. As another non-limiting example, the MUX device 610 may use the SBU pins A8 and B8 as a differential pair, and may transmit the AUX signals and the USB 2.0 signals as a packet-based or frame-based signal using low voltage differential signaling (LVDS) or any other suitable technique such that the signals can be separated by a device on the downstream end of the cable. Such techniques for communicating both AUX information and non-AUX information via a common channel are described in commonly owned U.S. Pat. No. 8,615,611, filed Jul. 2, 2012, and commonly owned U.S. Pat. No. 8,549,197, filed Oct. 1, 2013, the entire disclosures of which are hereby incorporated by reference herein for all purposes.

The transmission of both the AUX signals and the USB 2.0 signals via the SBU pins A8 and B8 free up other pins in the USB Type-C receptacle 608 for other types of communication. As illustrated, the SuperSpeed transmit differential pair and the SuperSpeed receive differential pair of the USB host controller 604 are coupled to the first pair of SuperSpeed transmit pins A2 and A3 and the first pair of SuperSpeed transmit pins B10 and B11, similar to the description above. However, now that a pair of pins is not needed to transmit the USB 2.0 information, and the USB 2.0 pins on the USB Type-C receptacle 608 are not shorted together, all four lanes of DisplayPort information may be routed through the USB Type-C receptacle. As shown, the switching device 606 couples the first lane differential pair to the second pair of USB 2.0 pins B6 and B7, the second lane differential pair to the first pair of USB 2.0 pins A6 and A7, the third lane differential pair to the second pair of SuperSpeed receive pins A10 and A11, and the fourth lane differential pair to the second pair of SuperSpeed transmit pins B2 and B3.

In some embodiments, the updated plug and cable wiring described above with respect to FIGS. 2A and 2B are used in order to provide extra conductors not present in a standard USB Type-C plug and cable to be connected to the non-shorted USB 2.0 pins in the USB Type-C receptacle. In some embodiments, the wires used in the cable may also be non-standard in order to support higher-bandwidth communication via various channels. For example, instead of having a pair of separate sideband use wires having a wire gauge of 32-34 AWG, a cable to be used with embodiments of the present disclosure may include wires having a wire gauge of 26-30 AWG. As another example, instead of having a pair of separate sideband use wires, a cable to be used with embodiments of the present disclosure may use an unshielded twisted pair or a shielded differential pair for the sideband use wires. As still another example, a cable to be used with embodiments of the present disclosure may replace the unshielded twisted pair for the USB 2.0 wires with a shielded differential pair. In some embodiments, an active signal recovery technique (such as redrivers or equalizer-based technologies) may be used to recover high-quality signals from lower-than-expected quality conductors in the cable.

One of ordinary skill in the art will also recognize that the routing of signals to particular pins in the USB Type-C receptacle 608 illustrated in FIG. 6 is exemplary only, and that once the MUX device 610 has combined the USB 2.0 signals and the DisplayPort AUX signals to free up pins on the USB Type-C receptacle 608, any suitable routing of signals to pins in the USB Type-C receptacle 608 may be used.

Figure 7:
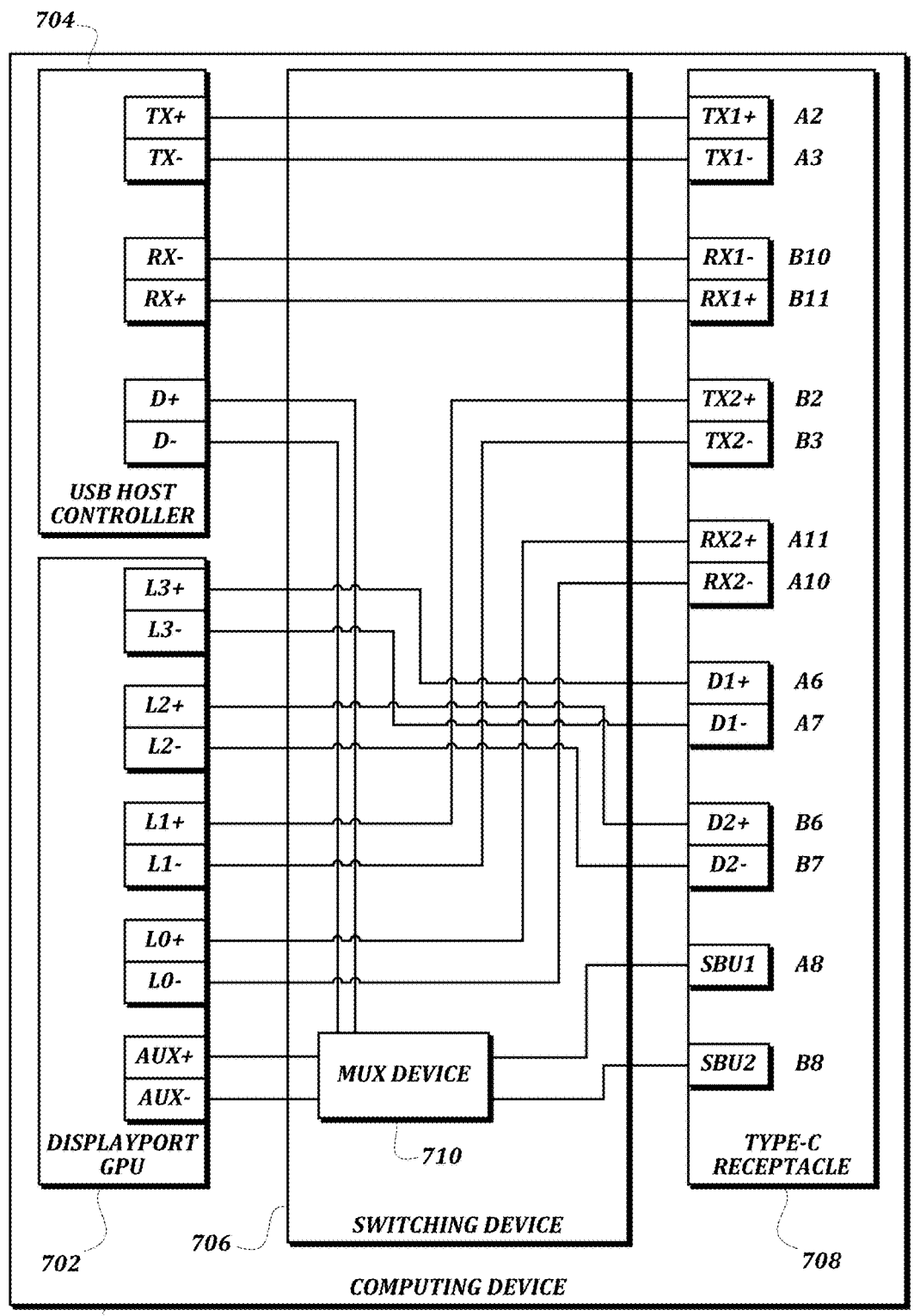
FIG. 7 is a schematic diagram that illustrates another exemplary embodiment of a computing device configured to concurrently communicate full-bandwidth DisplayPort information and SuperSpeed information via a USB Type-C receptacle according to various aspects of the present disclosure.

For example, FIG. 7 is a schematic diagram that illustrates another exemplary embodiment of a computing device configured to concurrently communicate full-bandwidth DisplayPort information and SuperSpeed information via a USB Type-C receptacle according to various aspects of the present disclosure. FIG. 7 illustrates a computing device 700, a DisplayPort GPU 702, a USB host controller 704, a switching device 706, a USB Type-C receptacle 708, and a MUX device 710 similar to those illustrated and discussed above with respect to FIG. 6. FIG. 7 is different in that the coupling of the first lane differential pair and the second lane differential pair has been swapped for the coupling of the third lane differential pair and the fourth lane differential pair. That is, the first lane differential pair is coupled to the second pair of SuperSpeed receive pins A10 and A11, the second lane differential pair is coupled to the second pair of SuperSpeed transmit pins B2 and B3, the third lane differential pair is coupled to the second pair of USB 2.0 pins B6 and B7, and the fourth lane differential pair is coupled to the first pair of USB 2.0 pins A6 and A7. Other than this change in switching, the features of FIG. 7 are substantially the same as those illustrated and described above with respect to FIG. 6 and so are not repeated here.

Figure 8:
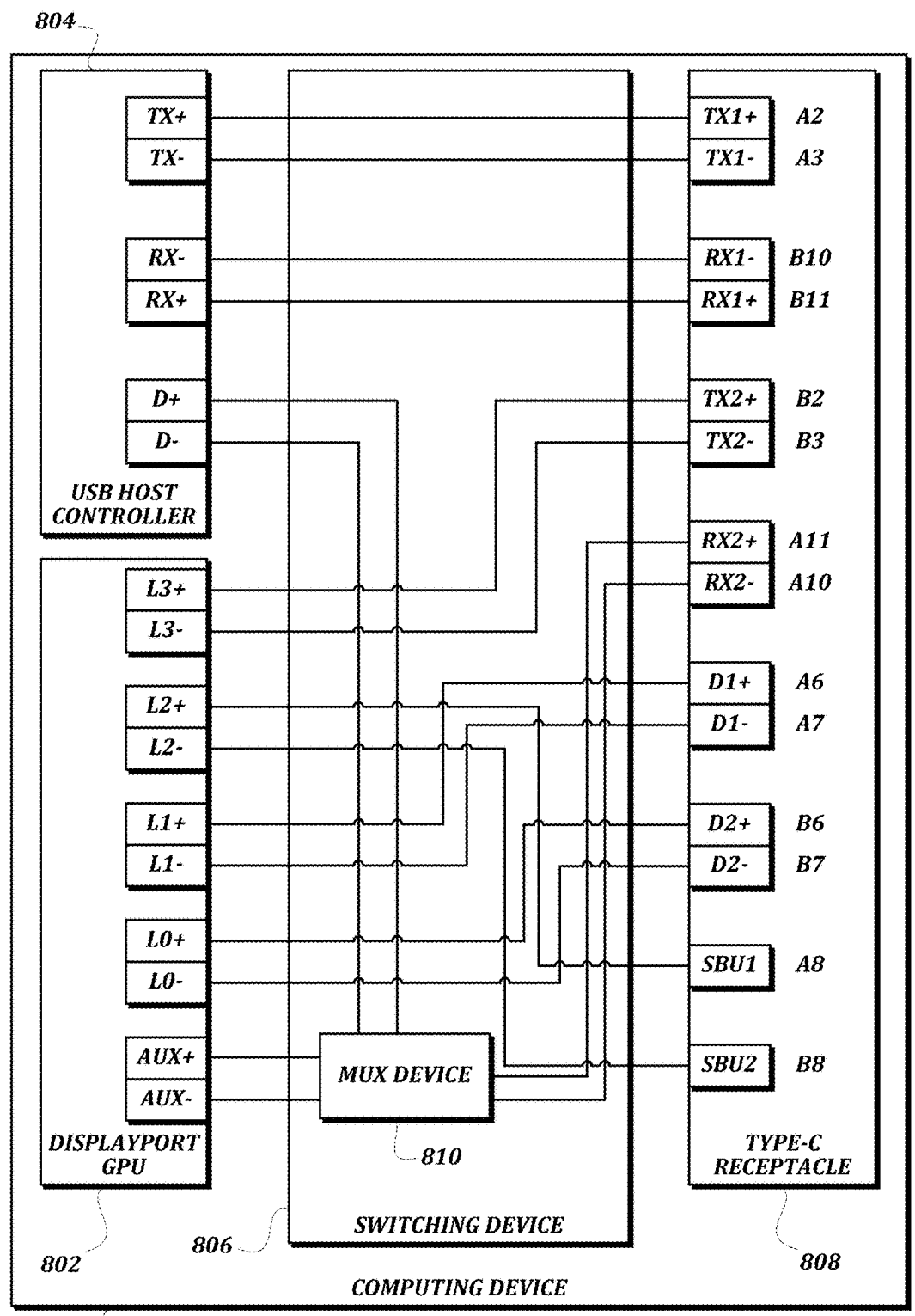
FIG. 8 is a schematic diagram that illustrates yet another exemplary embodiment of a computing device configured to concurrently communicate full-bandwidth DisplayPort information and SuperSpeed information via a USB Type-C receptacle according to various aspects of the present disclosure.

As another example, FIG. 8 is a schematic diagram that illustrates yet another exemplary embodiment of a computing device configured to concurrently communicate full-bandwidth DisplayPort information and SuperSpeed information via a USB Type-C receptacle according to various aspects of the present disclosure. FIG. 8 illustrates a computing device 800, a DisplayPort GPU 802, a USB host controller 804, a switching device 806, a USB Type-C receptacle 808, and a MUX device 810 similar to those illustrated and discussed above with respect to FIGS. 6 and 7. However, FIG. 8 illustrates that, in some embodiments, the switching device 806 may be configured to couple the MUX device 810 to other pins of the USB Type-C receptacle 808. As illustrated, the switching device 806 has coupled the MUX device 810 to the second pair of SuperSpeed receive pins A10 and A11 instead of the pair of SBU pins A8 and B8. The remainder of the couplings performed by the switching device 806 are thereafter rearranged by the switching device 806 accordingly: the first lane differential pair is coupled to the second pair of USB 2.0 pins B6 and B7, the second lane differential pair is coupled to the first pair of USB 2.0 pins A6 and A7, the third lane differential pair is coupled to the pair of SBU pins A8 and B8, and the third lane differential pair is coupled to the second set of SuperSpeed transmit pins B2 and B3. Other than these changes in switching, the features of FIG. 8 are substantially the same as those illustrated and described above with respect to FIGS. 6 and 7 and so are not repeated here.

The embodiments illustrated in FIGS. 6, 7, and 8 each utilized the USB Type-C receptacle illustrated in FIG. 2A and the plug and cable illustrated in FIG. 2B and described above. One of ordinary skill in the art will recognize that the USB Type-C receptacles illustrated in FIGS. 6, 7, and 8 also include other pins that were not illustrated, such as a pair of CC pins, a set of ground pins, and a set of $V_{BUS}$ pins. The embodiments illustrated in FIGS. 6, 7, and 8 use these pins for their standard purposes, including for detecting cable orientation and capabilities and for USB Power Delivery 2.0, and so they are not illustrated herein for the sake of clarity. Further, because the CC pin is available for the exchange of configuration messages such as USB PD Structured Vendor Defined messages, the embodiments illustrated in FIGS. 6, 7, and 8 can advertise the capability of concurrently supporting four lanes of DisplayPort information, SuperSpeed information, and USB 2.0 information via such messages, and can also negotiate which conductors to use for which signals via such messages.

In some embodiments of the present disclosure, a switching device and MUX device are used that provide SuperSpeed communication and full bandwidth DisplayPort communication over standard USB Type-C receptacles, plugs, and cables as illustrated in FIGS. 1A and 1B and described above. Because such embodiments cannot rely on the presence of two distinct pairs of USB 2.0 pins or their associated wires in the cable, a different technique is used to free up pins in the USB Type-C receptacle for full bandwidth DisplayPort communication concurrent with SuperSpeed communication.

Figure 9:
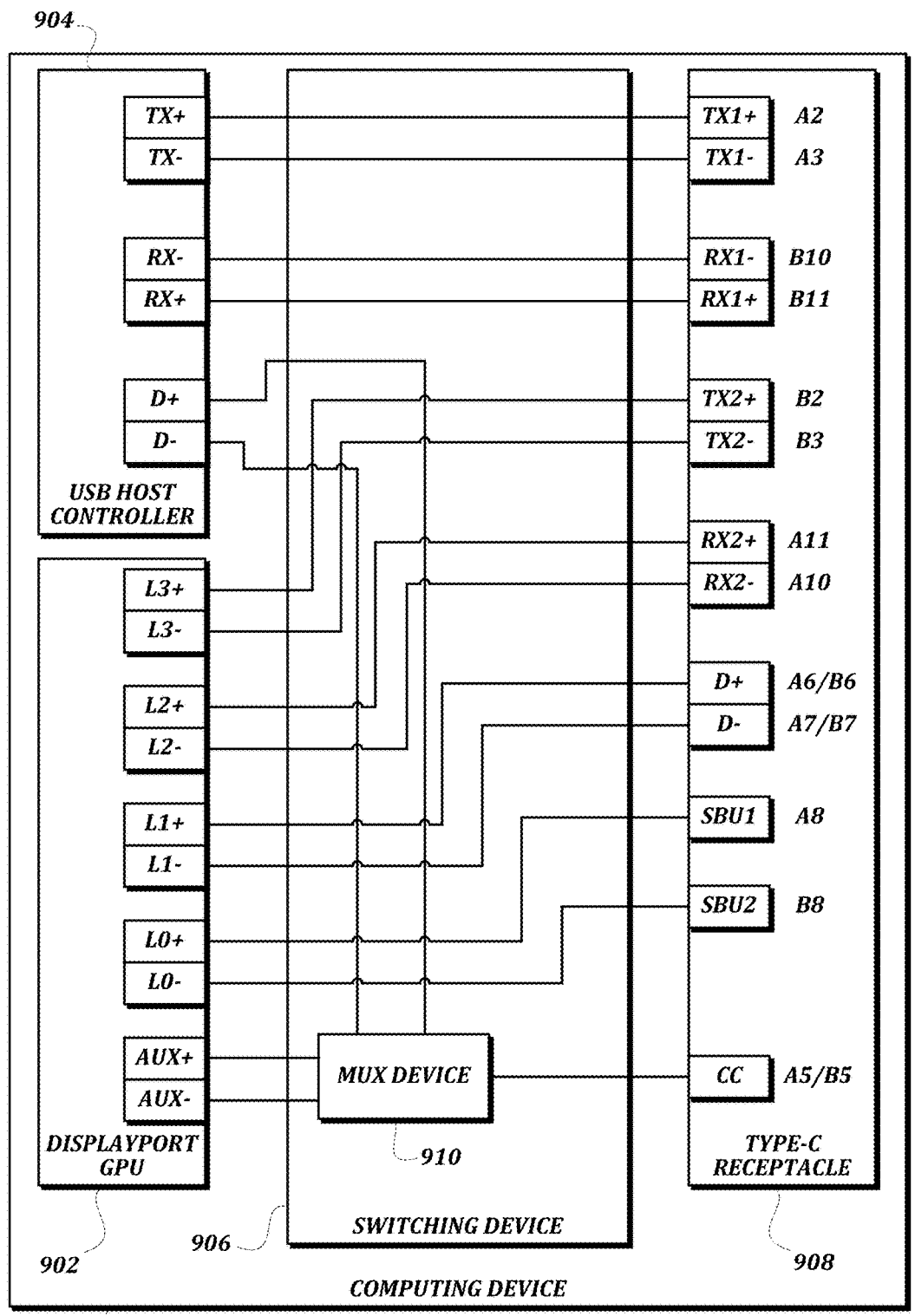
FIG. 9 is a schematic diagram that illustrates an exemplary embodiment of a computing device configured to concurrently communicate full-bandwidth DisplayPort information and SuperSpeed information via a USB Type-C receptacle according to various aspects of the present disclosure.

FIG. 9 is a schematic diagram that illustrates an exemplary embodiment of a computing device configured to concurrently communicate full-bandwidth DisplayPort information and SuperSpeed information via a USB Type-C receptacle according to various aspects of the present disclosure. As illustrated, the computing device 900, DisplayPort GPU 902, and USB host controller 904 are similar to those illustrated and discussed above, so are not described in further detail here for the sake of brevity. The USB Type-C receptacle 908 is standard, and so may have the positive USB 2.0 pins A6 and B6 shorted to each other, and may have the negative USB 2.0 pins A7 and B7 shorted to each other. Further, even if they were not shorted to each other, upon insertion of the standard USB Type-C plug only one set of USB 2.0 pins would be electrically coupled to wires within the cable. As such, only one set of USB 2.0 pins is illustrated in FIG. 9 to represent the pins which are electrically coupled to wires within the cable upon insertion of a USB Type-C plug to the receptacle.

As in the previously illustrated and described embodiments, the switching device 906 includes a MUX device 910 that is coupled to the USB 2.0 differential pair of the USB host controller 904 and the AUX differential pair of the DisplayPort GPU 902. However, instead of multiplexing the USB 2.0 signals and the AUX signals to a pair of pins on the USB Type-C receptacle 908, the MUX device 910 multiplexes the USB 2.0 signals and the AUX signals to a single CC pin A5 (or B5, depending on the plug orientation and cable twist). The MUX device 910 again combines the USB 2.0 signals and the AUX signals using any suitable technique, including but not limited to those disclosed in the previously incorporated U.S. Pat. Nos. 8,615,611 and 8,549,197. This combined signal is transmitted via the single conductor using any suitable single-ended signaling technique, including but not limited to single-terminated stub techniques such as SSTL.

Once the USB 2.0 signals and the AUX signals have been multiplexed to be transmitted via the CC pin A5/B5, the remaining conductors may be coupled to pins of the USB Type-C receptacle 908 in any combination, similar to the discussion above with respect to the previously discussed embodiments. For example, as illustrated in FIG. 9, the switching device 906 couples the SuperSpeed transmit differential pair to the first pair of SuperSpeed transmit pins A2 and A3, the SuperSpeed receive differential pair to the first pair of SuperSpeed receive pins B10 and B11, the first lane differential pair to the pair of SBU pins A8 and B8, the second lane differential pair to the pair of USB 2.0 pins A6/B6 and A7/B7, the third lane differential pair to the second pair of SuperSpeed receive pins A10 and A11, and the fourth lane differential pair to the second pair of SuperSpeed transmit pins B2 and B3.

Figure 10:
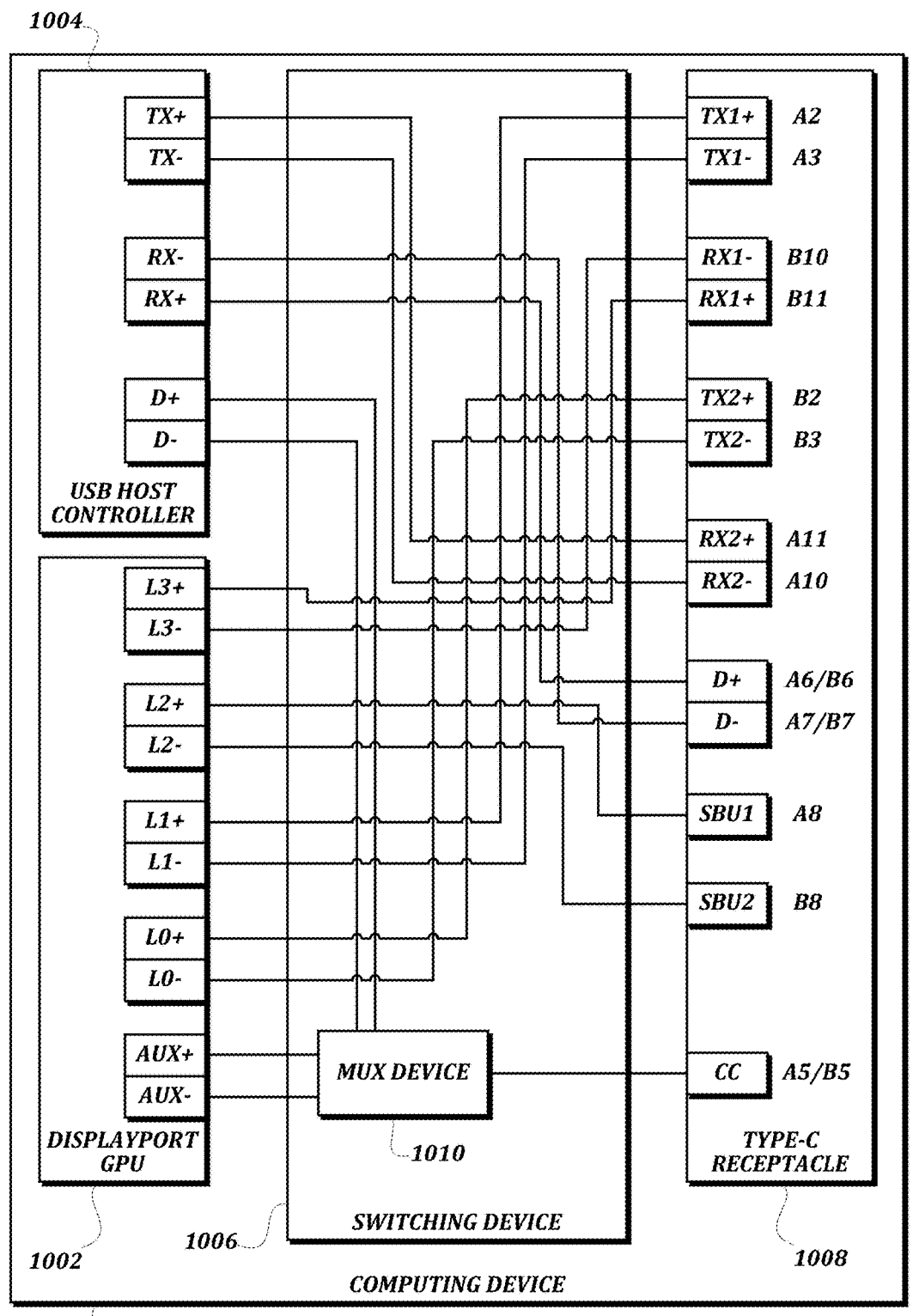
FIG. 10 is a schematic diagram that illustrates another exemplary embodiment of a computing device configured to concurrently communicate full-bandwidth DisplayPort information and SuperSpeed information via a USB Type-C receptacle according to various aspects of the present disclosure.

FIG. 10 is a schematic diagram that illustrates another exemplary embodiment of a computing device configured to concurrently communicate full-bandwidth DisplayPort information and SuperSpeed information via a USB Type-C receptacle according to various aspects of the present disclosure. The computing device 1000, DisplayPort GPU 1002, USB host controller 1004, switching device 1006, USB Type-C receptacle 1008, and MUX device 1010 are largely similar to those described above with respect to FIG. 9. Because the data signals may be coupled by the switching device 1006 to the pins of the USB Type-C receptacle 1008 in any pattern, FIG. 10 is provided to show another example of a mapping of conductors to pins as provided by the switching device 1006.

In FIG. 10, the switching device 1006 has again coupled the MUX device 1010 to a single CC pin A5 or B5 of the USB Type-C receptacle 1008. In contrast to FIG. 9 however, the switching device 1006 of FIG. 10 has coupled the SuperSpeed transmit differential pair to the second pair of SuperSpeed receive pins A10 and A11, the SuperSpeed receive differential pair to the pair of USB 2.0 pins A6/B6 and A7/B7, the first lane differential pair to the second pair of SuperSpeed transmit pins B2 and B3, the second lane differential pair to the first pair of SuperSpeed transmit pins A2 and A3, the third lane differential pair to the pair of SBU pins A8 and B8, and the fourth lane differential pair to the first pair of SuperSpeed receive pins B10 and B11.

This helps illustrate that the switching device 1006 may couple the conductors to the pins of the USB Type-C receptacle 1008 in any pattern or combination, and that the illustrated patterns are exemplary only. In some embodiments, differential pairs may be split (e.g., a first conductor of the first lane differential pair may be coupled to a pin such as A11, and the second conductor of the first lane differential pair may be coupled to a pin such as B7) in any combination. In some embodiments, the switching device is configured to use a predetermined pattern of coupling based on the data signals transmitted by the USB host controller and the DisplayPort GPU. In some embodiments, the pattern of coupling may be user-configurable based on a firmware setting, a physical dip switch setting, a jumper setting, and/or the like.

The embodiments illustrated in FIGS. 9 and 10 each utilized the USB Type-C receptacle illustrated in FIG. 1A and the plug and cable illustrated in FIG. 1B and described above. One of ordinary skill in the art will recognize that the USB Type-C receptacles illustrated in FIGS. 9 and 10 also include other pins that were not illustrated, such as a set of ground pins and a set of $V_{BUS}$ pins. The embodiments illustrated in FIGS. 9 and 10 use these pins for their standard purposes, and so they are not illustrated herein for the sake of clarity. Unlike the embodiments illustrated in FIGS. 6, 7, and 8, the embodiments illustrated in FIGS. 9 and 10 alter the behavior of the CC pin in order to concurrently provide SuperSpeed, USB 2.0, and full bandwidth DisplayPort communication. As such, special techniques may be used in order to maintain backwards compatibility with standard USB Alternate Mode operation as well as standard SuperSpeed operation over a USB Type-C link medium.

Figure 11:
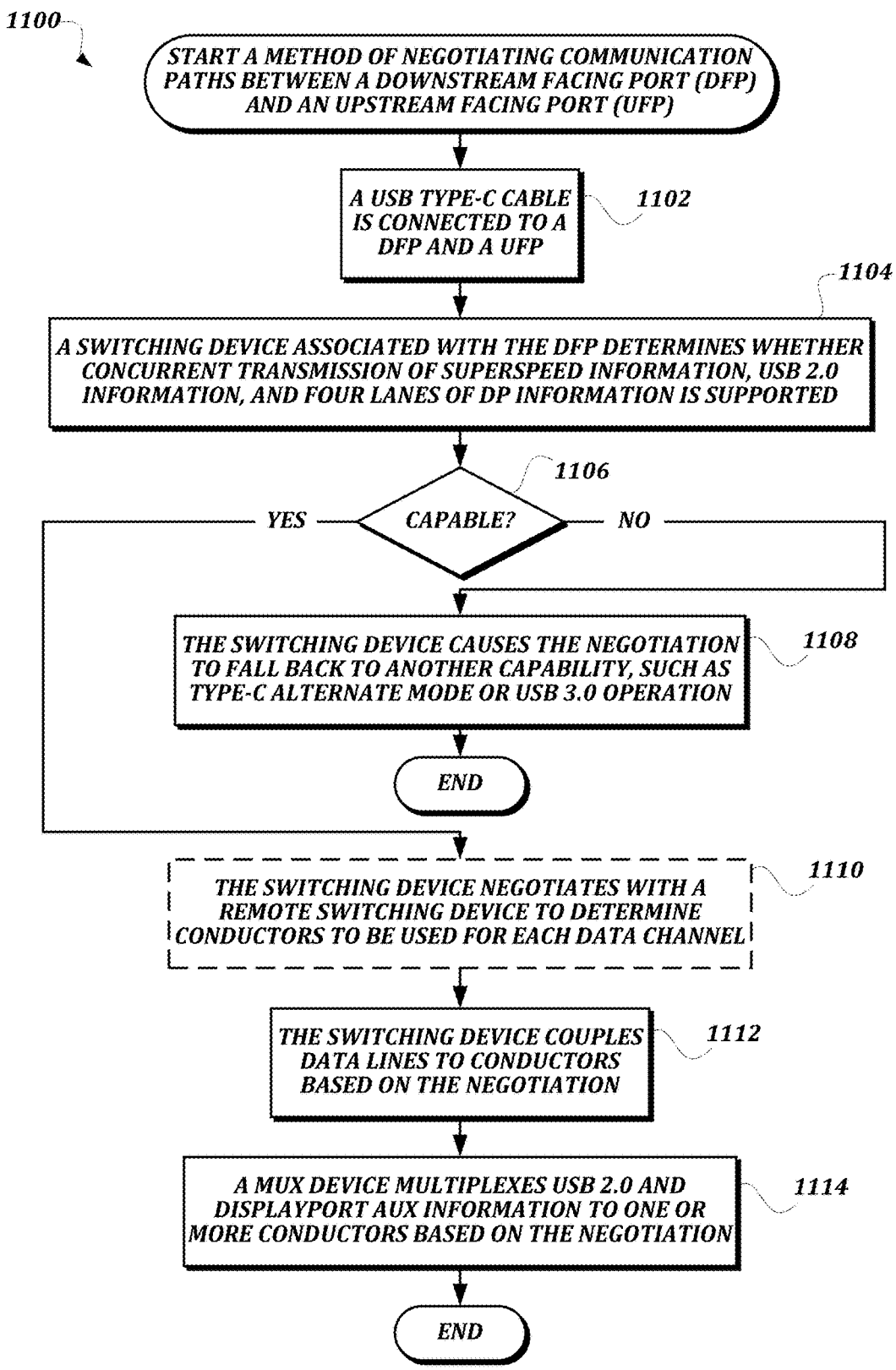
FIG. 11 is a flowchart that illustrates a method of negotiating communication paths between a downstream facing port (DFP) and an upstream facing port (UFP) according to various aspects of the present disclosure.

FIG. 11 is a flowchart that illustrates a method of negotiating communication paths between a downstream facing port (DFP) and an upstream facing port (UFP) according to various aspects of the present disclosure. The method 1100 is appropriate for use with the embodiments illustrated in FIGS. 9 and 10 wherein the CC pin may be used for non-standard purposes, though could also be used in other embodiments.

From a start block, the method 1100 proceeds to block 1102, where a USB Type-C cable is connected to a DFP and a UFP. As understood by one of ordinary skill in the art, the DFP may be the USB Type-C receptacle 908 or the USB Type-C receptacle 1008 illustrated and discussed above, and the UFP may be a corresponding USB Type-C receptacle (not illustrated). The remainder of the method 1100 is described from the point of view of the DFP for ease of discussion, but one of ordinary skill in the art will recognize that corresponding actions may also be performed at the UFP in order to complete the negotiation.

Next, at block 1104, a switching device 1006 associated with the DFP determines whether concurrent transmission of SuperSpeed information, USB 2.0 information, and four lanes of DisplayPort information is supported. At this stage, power delivery may also be negotiated.

Various techniques may be used by the switching device 1006 to determine whether concurrent transmission is supported. In some embodiments, the switching device 1006 may exchange structured vendor defined messages that list transmitting multiplexed USB 2.0 and DisplayPort AUX over the CC pin as a capability. In some embodiments, the switching device 1006 may attempt to communicate with its counterpart switching device at the UFP via a software-controlled, non-standard protocol over the CC pin prior to the handoff to the MUX device 1010, and determine that concurrent transmission is supported based on those non-standard communications. In some embodiments, the switching device 1006 and its counterpart may use USB SuperSpeed Receiver Detection and DisplayPort characteristic impedance measurements as defined in their respective specifications to determine which conductors have been coupled to DisplayPort lanes and which conductors have been coupled to SuperSpeed conductors. In such embodiments, the switching device 1006 may determine that the link is capable based on successful detection of all four DisplayPort lanes as well as successful SuperSpeed receiver detection.

The method 1100 then proceeds to a decision block 1106, where a test is performed based on the result of the determination of whether both ends of the link support concurrent transmission. If it was determined that at least one end of the link is not capable of concurrent transmission, then the result of the test at decision block 1106 is NO, and the method 1100 proceeds to block 1108. At block 1108, the switching device 1106 causes the negotiation to fall back to another capability that is supported by both ends of the link, such as Type-C Alternate Mode operation, concurrent use of SuperSpeed and partial bandwidth DisplayPort, and/or the like. The method 1100 then proceeds to an end block and terminates.

Otherwise, if it was determined that both ends of the link are capable of concurrent transmission, then the result of the test at decision block 1106 is YES, and the method 1100 proceeds to optional block 1110, where the switching device 1006 negotiates with the remote switching device to determine conductors to be used for each data channel. Because of the variable configurability of the switching device 1006, the two ends of the connection should ensure that they are transmitting the expected information over the expected conductors (e.g., that the switching device 1006 is configured as illustrated in FIG. 10 as opposed to being configured as the switching device 906 illustrated in FIG. 9). Block 1110 is illustrated as optional because in some embodiments the configuration may be negotiated or detected as part of the determination performed in block 1104, and in other embodiments the configuration may be assumed to be in a predetermined default state if the link is determined to be capable.

Next, at block 1112, the switching device 1006 couples data lines to conductors based on the negotiation, and at block 1114, a MUX device 1010 multiplexes USB 2.0 and DisplayPort AUX information to one or more conductors based on the negotiation. This coupling and multiplexing (and the de-multiplexing performed at the UFP) is as illustrated and described with respect to FIGS. 9 and/or 10, and so is not repeated here. The method 1100 then proceeds to an end block and terminates.

While illustrative embodiments have been illustrated and described, it will be appreciated that various changes can be made therein without departing from the spirit and scope of the invention. For example, one of ordinary skill in the art will recognize that, although configurations of the source/upstream side of the USB and DisplayPort connections are shown, similar USB Type-C receptacles, switching devices, and MUX devices are used at the sink/downstream side of the USB and DisplayPort connections to concurrently receive SuperSpeed and full-bandwidth DisplayPort communication over the single cable. Because the MUX device, USB Type-C receptacle, and switching device on sink/downstream side will work in the inverse of the matching devices on the source/upstream side that have been described herein at length, their implementation is within the capabilities of one of ordinary skill in the art without being further described herein. Further, although DisplayPort AUX is primarily discussed herein, one of ordinary skill in the art will recognize that DisplayPort FAUX signaling may be used over the AUX differential pair in addition to or instead of AUX.

While illustrative embodiments have been illustrated and described, it will be appreciated that various changes can be made therein without departing from the spirit and scope of the invention.

The embodiments of the invention which an exclusive property or privilege is claimed are defined as follows:

1. A cable, comprising:
   a plug having pins compliant with a USB Type-C plug standard; and
   wires compliant with a USB Type-C wiring standard except for the side band use (SBU) wires;
   wherein the SBU wires are configured to carry a DisplayPort main link lane signal or a combined USB 2.0 and DisplayPort AUX signal.

2. The cable of claim 1, wherein the SBU wires are replaced with a shielded differential pair.

3. The cable of claim 1, wherein the SBU wires are replaced with an unshielded twisted pair.

4. The cable of claim 1, wherein the SBU wires are replaced with wires having a wire gauge between 26-30 AWG.

5. A cable comprising:
   at least one plug and a plurality of wires;
   wherein the at least one plug has a shape configured to mate with a USB Type-C receptacle;
   wherein the at least one plug includes twenty-four pins configured to mate with twenty-four corresponding pins of the USB Type-C receptacle;
   wherein the twenty-four pins of the at least one plug include:
     twenty-two pins compliant with a USB Type-C plug standard, wherein the twenty-two pins include a first pair of USB 2.0 pins; and
     two pins that are not compliant with the USB Type-C plug standard, wherein the two pins include a second pair of USB 2.0 pins that are electrically separated from the first pair of USB 2.0 pins; and
   wherein the first pair of USB 2.0 pins are configured to carry a first data signal while the second pair of USB 2.0 pins concurrently carry a second data signal.

6. The cable of claim 5, wherein SBU wires of the plurality of wires do not comply with the USB Type-C wiring standard.

7. The cable of claim 6, wherein the SBU wires are a shielded differential pair.

8. The cable of claim 6, wherein the SBU wires are an unshielded twisted pair.

9. The cable of claim 6, wherein the SBU wires are wires having a wire gauge of 26-30 AWG.

10. The cable of claim 6, wherein the SBU wires are configured to carry a DisplayPort lane signal or a combined USB 2.0 and DisplayPort AUX signal.

11. The cable of claim 5, wherein the plurality of wires are compliant with a USB Type-C wiring standard except for an extra twisted pair of wires coupled to the second pair of USB 2.0 pins.

12. The cable of claim 5, wherein the first data signal is a first DisplayPort lane and the second data signal is a second DisplayPort lane.

* * * * *